Nov. 29, 1960  H. E. HANSEN  2,962,149
MOVING STAIRWAYS
Filed Sept. 26, 1958  2 Sheets-Sheet 2

United States Patent Office 2,962,149
Patented Nov. 29, 1960

2,962,149

MOVING STAIRWAYS

Hans E. Hansen, Staten Island, N.Y., assignor to Westinghouse Electric Corporation, East Pittsburgh, Pa., a corporation of Pennsylvania Filed Sept. 26, 1958, Ser. No. 763,734

4 Claims. (Cl. 198—16)

This invention relates to conveyors and it has particular relation to moving stairways suitable for conveying passengers between two levels or landings such as successive floors of a building.

The invention may be applied to various forms of conveyors but it is particularly useful for those conveyors having chains which move in the same direction to propel platforms. In the case of moving stairways, the platforms are steps on which the stairway passengers stand.

In the usual construction of moving stairways, each step has a cleated tread. The tread cleats run from the front to the rear of the tread and are aligned parallel to the direction of movement of the steps. Between each pair of adjacent cleats of a tread is a groove that runs from the front to the rear of the tread. At each landing of the stairway, where the moving steps "disappear" under the stationary floor parts, there is provided a comb plate which has a plurality of teeth, one of which extends into each tread groove but which does not touch the adjacent tread cleats. These teeth prevent any object which may be in the grooves from being drawn under the comb plate. Any such object is literally "combed-out" of the groove.

The stairway is also generally provided with a skirt guard running the length of the stairway at each side thereof adjacent the corresponding sides of the steps. It is desirable to maintain as close a spacing as practicable between the sides of the steps and the skirt guards to minimize the possibility of objects being caught therebetween.

It will be appreciated that this structure requires many close clearances and it will also be evident that any looseness or friction between the aforementioned stairway parts is undesirable.

Ordinarily, each stairway step rides on four rollers, each roller being supported by a separate track. The rollers are mounted on two step axles. The leading axle of an up-moving step passes through two spaced parallel endless driving chains for moving the step. These chains pass over a pair of sprocket wheels at the top level of the stairway, the sprocket wheels being driven by a motor. The chains pass over idler sprocket wheels at the lower level of the stairway. Thus the steps are pulled uphill on upward movement thereof and pushed downhill on downward movement thereof. The rear axle of each step merely supports the step and part of its load.

It is believed obvious that such a structure should track true so that the steps do not tend to run toward one side. It will also be seen that if the two step driving chains should wear unequally, so that one "stretches" and becomes longer than the other, the steps will no longer travel along a path parallel to the tracks but will tend to move with one side advanced, i.e., sideways, or in a skewed direction. Such sideways movement tends to cause the comb plate teeth to bear against the sides of the step tread cleats. Since the step rollers are no longer rotating in a plane parallel to the tracks, there will be a scuffing action which causes additional step roller wear. Furthermore, there is a possibility that the sides of the steps will contact the stairway skirt guards. It is, therefore, desirable to prevent unequal wear in the driving chains.

It has been found that such unequal wear may be due to insufficient lubrication of the moving parts or to variations in materials or manufacturing, etc., or to a combination of these factors. I have devised a novel improvement that prevents such unequal wear even when these conditions exist.

In accordance with the invention, the idler sprocket wheels at the lower end of a moving stairway are supported by a movable carriage. In a preferred embodiment of the invention, the carriage includes a sprocket fork or yoke, through which the ends of the common axle of the idler sprocket wheels pass. The yoke, in turn, is supported by a plurality of rollers, each roller being disposed on an associated roller track. Resilient means in the form of a tension spring biases the sprocket in the proper direction for maintaining the stairway driving chains taut. In order to prevent unequal wear in the driving chains, guide means are provided which permit movement of the idler sprocket wheel carriage in a horizontal plane transverse to the wheel axle, while at the same time preventing pivotal movement of the carriage in a horizontal plane. Such construction, in turn, prevents sideways or skewed movement of the stairway steps.

Conveniently, switch means may be employed in cooperation with the idler sprocket wheel carriage to effect the deenergization of the stairway driving motor and to cause the motor service brake to be applied upon predetermined movement of the carriage due to excessive chain wear or breakage or due to an obstruction which prevents normal movement of the steps.

It is, therefore, an object of the invention to provide improved construction for moving stairways.

It is another object of the invention to provide a moving stairway with means for preventing rotation of the stairway steps about a vertical axis through the centers of the steps, thereby to prevent a tendency for the steps to move in a skewed direction.

It is a further object of the invention to provide a moving stairway which has a pair of step driving chains, wherein undue wear of the stairway step rollers is prevented and wherein the steps are prevented from contacting the stairway comb plates and skirt guards upon the occurrence of driving chain wear.

It is an additional object of the invention to provide a moving stairway which has a pair of step driving chains with means for preventing unequal chain wear.

It is another object of the invention to provide a moving stairway as defined in either of the two preceding paragraphs wherein the step driving chains are supported by a movable carriage.

It is a still further object of the invention to provide a moving stairway as defined in the preceding paragraph, wherein further movement of the stairway is prevented upon predetermined movement of the carriage.

Other objects of the invention will be apparent from the following description taken in conjunction with the accompanying drawings, in which.

Figure 1:
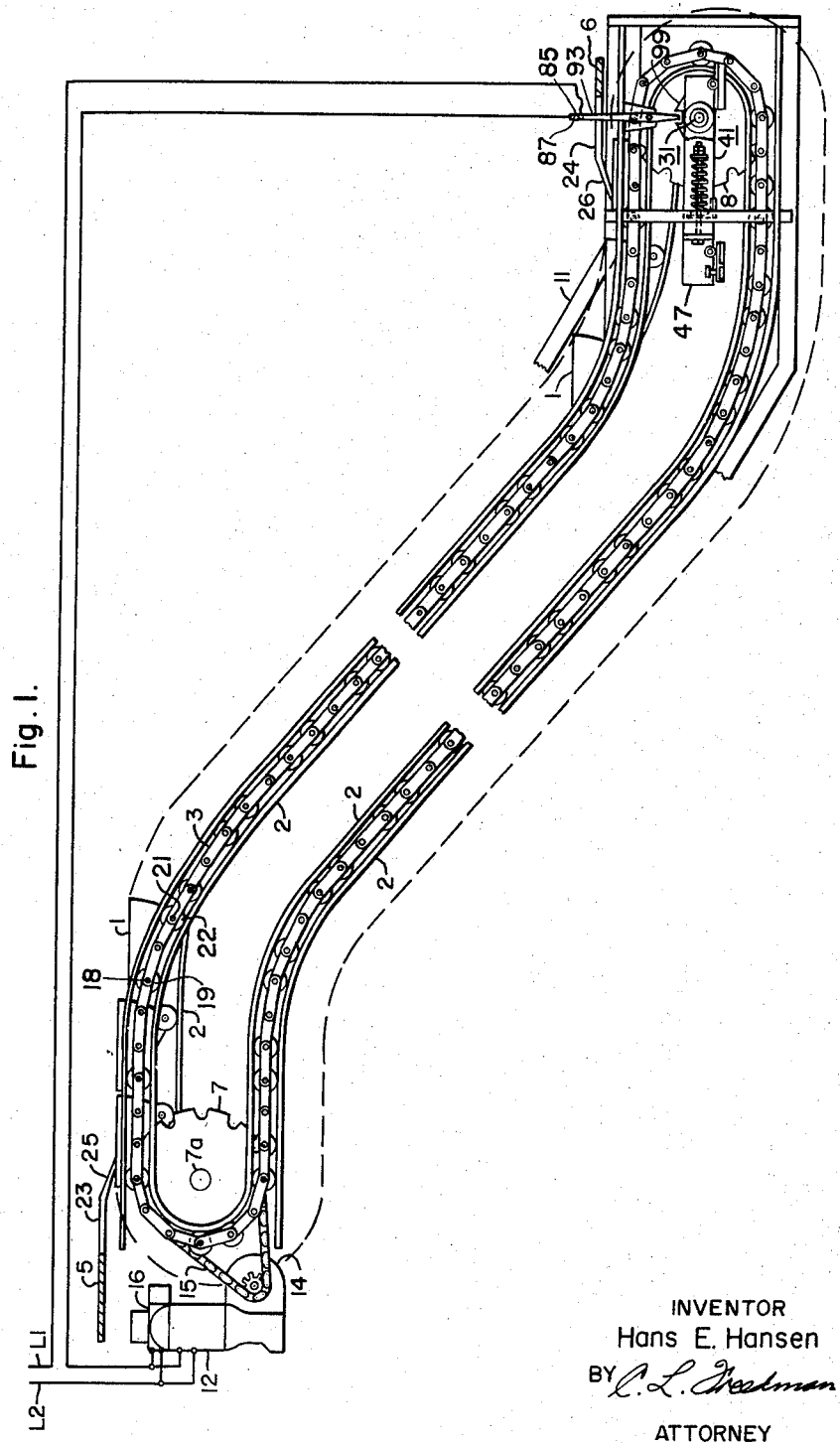
Figure 1 is a view in side elevation with parts omitted and parts broken away of a typical moving stairway embodying one form of the invention.

Referring to the drawings, Fig. 1 illustrates a moving stairway comprising an endless series of movable steps 1 disposed to be moved along tracks 2 by a pair of spaced parallel endless driving chains 3 and 4 (Fig. 2) between an upper landing 5 and a lower landing 6. Each driving chain comprises a plurality of pivotally interconnected links. These chains are supported at the upper landing by a pair of driving sprocket wheels 7 and at the lower landing by a pair of tension idler sprocket wheels 8 and 9. A suitable truss 11 of structural steel is provided for supporting the stairway between the upper landing and the lower landing.

The driving sprocket wheels 7, which are secured to a common axle 7a, may be driven by a motor 12 through suitable reduction gearing 14 connected to the motor shaft (not shown) and an endless chain 15. A suitable spring-applied electromagnetically-released brake 16 is disposed to apply a braking force to the motor shaft when it is desired to stop movement of the stairway steps. The motor 12 may be reversibly energized to effect either upward or downward movement of the steps on their upper or load-carrying run. For the purpose of illustration it will be assumed that the motor 12 is energized to effect movement of the stairway steps from the lower landing 6 to the upper landing 5 during their load-carrying run.

Each of the steps 1 is mounted upon a suitable front axle 18 which extends through the adjacent links of the driving chains 3 and 4. A pair of leading wheels 19 is rotatably mounted on the outer ends of the axle 18 for supporting the front portion of the step on the tracks 2. The rear portion of the step is provided with an axle 21, upon which is rotatably mounted a pair of trailing wheels 22 in position to engage cooperating portions of the tracks 2 as the steps move along their course.

Figure 2:
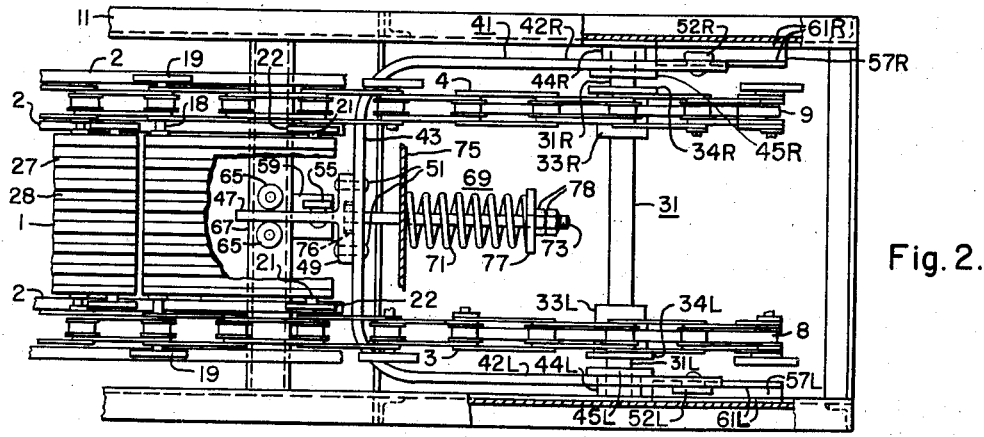
Fig. 2 is a plan view with parts broken away, parts omitted and parts in section of the lower idler sprocket wheel assembly of the moving stairway of Fig. 1.
Figure 4:
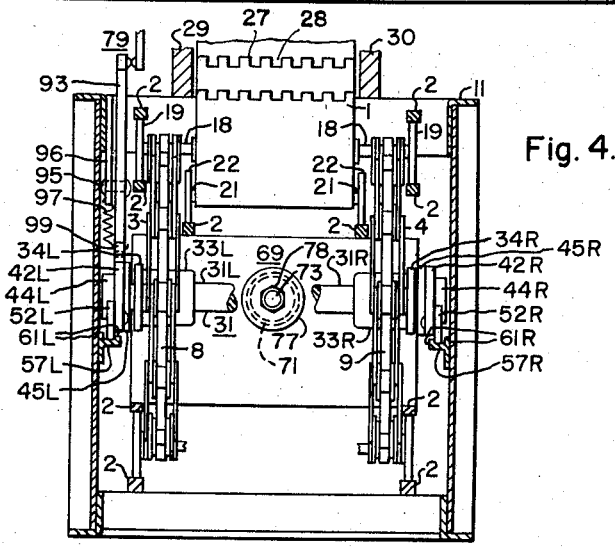
Fig. 4 is a view in end elevation with parts omitted, parts broken away and parts in section of the lower idler sprocket wheel assembly.

A comb plate 23 is disposed at the upper landing 5, while a comb plate 24 is disposed at the lower landing 6. Each of these comb plates has a plurality of teeth 25 and 26, respectively. Each of the steps 1 has a tread which is provided with a plurality of cleats 27 and grooves 28 therebetween, the cleats and grooves running in the direction of step travel (Fig. 2). The comb plate teeth 25 and 26 are adapted to extend into the grooves 28 and thereby to intermesh with the cleats 27 as the steps pass under the comb plates 23 and 24 at the landings 5 and 6, respectively. Positioned at the sides of the steps 1 and spaced therefrom by a minimum practicable distance are a pair of stairway skirt guards 29 and 30 running the length of the stairway (Fig. 4).

The lower sprocket wheels 8 and 9 are disposed for rotation on a common axle 31. The axle 31 has a left-hand section 31L and a right-hand section 31R, as viewed in Fig. 4. Secured to the sections 31L and 31R are bushings 33L and 33R, which extend through apertures in the sprocket wheels 8 and 9, respectively. The bushing 33L has a flange 34L, which is secured to the sprocket wheel 8 as by a plurality of bolts (not shown). The bushing 33R has a similar flange 34R, which is similarly secured to the sprocket wheel 9. Thus, the sprocket wheels 8 and 9 and the axle 31 rotate in unison with one another.

In order to maintain the driving chains 3 and 4 under such predetermined tension as may be deemed advisable, the axle 31 is mounted upon a movable carriage which includes a U-shaped carriage yoke or fork 41. The yoke 41 has a leg 42L disposed adjacent the sprocket wheel 8, a leg 42R disposed adjacent the sprocket wheel 9 and a base portion 43 interconnecting the legs 42L and 42R. The left-hand section 31L of the axle 31 extends into a bearing 44L, the housing of which extends through an aperture in the leg 41L of the yoke 41. The bearing 44L has a flange 45L, which is secured to the leg 42L as by a plurality of bolts 46. The right-hand section 31R of the axle 31 extends into a bearing 44R, the housing of which extends through an aperture in the yoke leg 42R. The bearing 44R has a flange 45R, which is secured to the leg 42R as by bolting. Thus, the axle 31 and thereby the sprocket wheels 8 and 9 are rotatable with respect to the yoke 41.

A yoke guide tongue 47 is secured to the base portion of the yoke 41 by means of a tongue flange 49 and a plurality of bolts 51. The legs 42L and 42R of the yoke 41 are supported by rollers 52L and 52R, respectively, the rollers being secured to the legs for rotation about their respective axes. The tongue 47 and thereby the base portion 43 of the yoke 41 are supported by a roller 55, which is secured to the tongue for rotation about its axis. The rollers 52L, 52R and 55, respectively, engage roller supporting tracks 57L, 57R and 59, which are secured as by welding to the truss 11. The tracks 57L and 57R have upright members 61L and 61R, respectively, disposed at the sides thereof for guiding movement of the rollers in a horizontal direction transverse to the axle 31 and for preventing substantial horizontal movement of the rollers in a direction parallel to the axle 31.

Disposed at each side of the tongue 47 and in contact therewith is a guide roller 65. The guide rollers 65 are secured for rotation about their respective axis to a truss member 67. These guide rollers enable the tongue 47 to move smoothly therebetween, while preventing lateral movement of the tongue.

Figure 3:
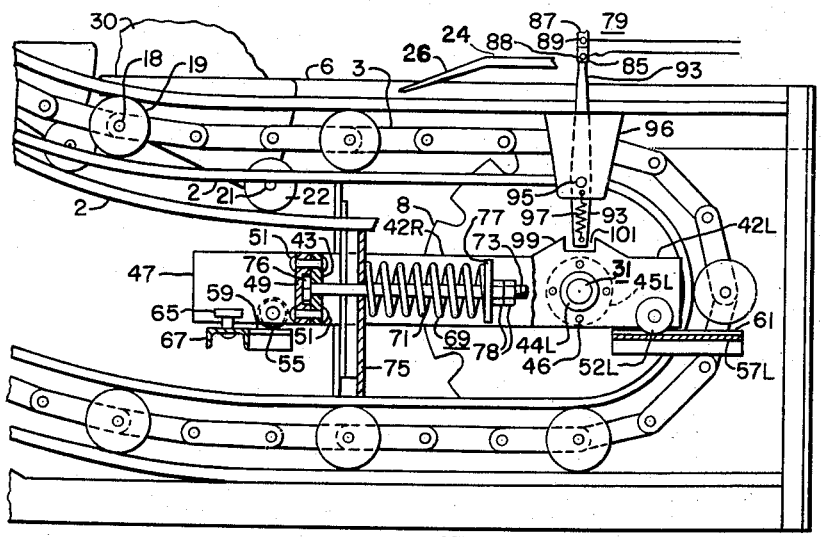
Fig. 3 is a view in side elevation with parts omitted, parts broken away and parts in section of the lower idler sprocket wheel assembly.

In view of the above description of the carriage for the axle 31, it will be seen that the carriage and thereby the sprocket wheels 8 and 9 may move to the right and left, as viewed in Figs. 2 and 3, upon the rollers 52L, 52R and 55. Pivotal movement of the carriage in a horizontal plane, however, is substantially prevented by means of cooperation of the tongue 47 with its guide rollers 65 and of the yoke supporting rollers 52L and 52R with the upright members 61L and 61R of their respective tracks 57L and 57R.

Tensioning means 69 is provided for the sprocket wheel axle carriage to maintain the driving chains 3 and 4 under such tension as may be desired. Tensioning means 69 includes a spring 71 concentrically disposed on a rod 73. The rod 73 extends through a plate 75, which is secured to the track assembly, and through the base portion 43 of the yoke 41. The rod is secured to the yoke by means of a nut 76 which is captively retained in a recess in the flange 49 of the guide tongue 47. As is shown in Figs. 2 and 3, one end of the spring 71 abuts the plate 75. The spring may be held under such compression as is desired by means of a washer 77 and a pair of nuts 78 which are threadably mounted on the rod 73. By means of the nuts 78 the position of the washer 77 and thereby the compression of the spring 71 may be adjusted. It follows, therefore, that the tension of the driving chains 3 and 4 may be adjusted as desired by adjusting the nuts 78 on the rod 73. A tension of approximately 800 pounds in each chain is typical.

It will be seen from the foregoing description that the sprocket wheels 8 and 9, by means of the carriage and the tensioning means 69, are arranged to move horizontally toward the right, as viewed in Figs. 2 and 3, to compensate for any wear in the driving chains 3 and 4 which, by causing the chains to lengthen, would make them looser if the idler sprocket wheels did not move horizontally to take up the slack. It will also be observed that if one chain should tend to wear more than the other because of lack of adequate lubrication, for example, the resulting looseness in such chain will cause the other chain to bear a greater load. This greater load, which results in greater tension in the slower-wearing chain, will, in turn, cause greater wear in that chain until such time as the wear in the two chains is equalized. In addition, it is apparent that since the carriage is unable to move pivotally in a horizontal plane, the steps 1 are at all times prevented from moving in a skewed direction, regardless of the wear in the driving chains 3 and 4.

A safety switching device 79, supported by any suitable means, is mounted adjacent the sprocket wheel 8. The switching device 79 includes a safety switch which comprises a movable contact member 85 and a fixed contact 87, on which are mounted suitable terminals 88 and 89, respectively. Electroconductive connecting wires run from the terminals 88 and 89.

The movable contact member 85 is actuated by a switch actuating arm 93 which is insulated from the contact member 85 by any suitable means. The arm 93 is pivotally mounted by means of a pivot 95 on a bracket 96, the bracket 96 being secured as by welding to the truss 11. The arm 93 is normally maintained in the position shown in Fig. 3 to maintain the safety switch in closed condition by means of a spring 97, one end of which is secured to the bracket 96, the opposite end of which is secured to the arm 93. On the leg 42L of the yoke 41 is mounted a switch cam 99. An end of the arm 93 extends into a cutout 101 in the cam 99, but the arm normally does not engage the cam itself.

In view of the foregoing construction, it will be seen that the movable switch contact member 85, the fixed switch contact 87, the switch actuating arm 93 and the cam 99 may be so proportioned that the safety switch will open if the axle carriage moves beyond a predetermined distance to either the right or left, as viewed in Figs. 2 and 3, since the cam 99 will then engage the arm 93, causing it to rotate about its pivot 95.

As is shown in Fig. 1, the safety switch is connected in series with a stairway motor and motor brake electrical energizing conductor L1. Another electrical energizing conductor L2 is connected directly to the motor and to the brake. Thus, the motor will be deenergized and the brake will be applied to stop movement of the steps 1 when the carriage moves beyond the predetermined distance in either direction. For example, as is mentioned above, upon wear of both of the chains 3 and 4, the chain tension spring 71 will cause the carriage to move toward the right, as viewed in Figs. 1, 2 and 3. When sufficient wear occurs to permit the carriage to move the predetermined distance, the cam 99 will contact the switch actuating arm 93 to open the safety switch. It will also be apparent that if either or both of the driving chains break, the consequent release of tension in the chains will permit the carriage to move toward the right due to expansion of the spring 71. Once again, the safety switch will be opened to deenergize the motor and to apply the brake to prevent further movement of the stairway steps.

In addition, if a step of a down-moving stairway engages an obstruction or if an object becomes lodged between a step and a landing comb plate, the steps thereby becoming unduly difficult to move, the pull of the driving chains 3 and 4 on the sprocket wheels 8 and 9 will cause the carriage to move toward the left. Such action will again result in opening of the safety switch to prevent further movement of the steps.

It should be noted that the safety switching device 79 may be mounted adjacent the sprocket wheel 9 rather than adjacent the sprocket wheel 8 as is shown in the drawings.

Although the invention has been described with reference to certain specific embodiments thereof, numerous modifications falling within the spirit and scope of the invention are possible.

I claim as my invention:

1. In a moving stairway, a supporting structure, a pair of spaced, parallel, endless flexible units movable relative to the supporting structure, a separate guide for each of the flexible units comprising a wheel, means mounting the wheels for rotation relative to the supporting structure for guiding each of the flexible units about the axis of its associated wheel, and a stairway step secured to the flexible units for movement therewith, said mounting means comprising a yoke for supporting said wheels, means mounting the wheels in the yoke for rotation relative to the yoke about a common wheel axis, a plurality of first rollers rotatably secured to the yoke for supporting the yoke and the wheels for movement relative to the supporting structure, first guide means for said first rollers, a tongue secured to said yoke, second guide means comprising a plurality of second rollers for said tongue, said first and second guide means permitting movement of the yoke and the wheels relative to the supporting structure in a direction substantially transverse to the common axis of the wheels and preventing pivotal movement of the yoke and the wheels relative to the supporting structure about an axis substantially transverse to the common axis of the wheels and to said direction, and means for maintaining the flexible units in taut condition.

2. In a moving stairway, stationary parts including a supporting structure, a pair of spaced, parallel, endless chains, motive means for driving the chains relative to the structure, a stairway step secured to the chains for movement therewith for appreciable distances past stationary parts closely adjacent said step, a pair of spaced sprocket wheels disposed for rotation relative to the supporting structure about a sprocket wheel axis for engaging respectively said chains to reverse the direction of travel thereof, a yoke for supporting said sprocket wheels, means mounting said sprocket wheels in the yoke for rotation relative to the yoke about said sprocket wheel axis, a plurality of rollers rotatably secured to the yoke for supporting the yoke and the sprocket wheels for movement relative to the supporting structure, a tongue secured to the yoke, and guide means for the tongue and the rollers for permitting movement of the yoke and the sprocket wheels relative to the supporting structure in a first direction substantially transverse to said sprocket wheel axis and in a second direction opposite to said first direction and for preventing pivotal movement of the yoke and the sprocket wheels relative to the supporting structure about an axis substantially transverse to said sprocket wheel axis and to said first and second directions, means for positioning the yoke and the sprocket wheels to maintain said chains taut, and means responsive to a predetermined movement of said yoke in each of said first and second directions for rendering said motive means ineffective to drive said chains.

3. In a moving stairway, stationary parts including a supporting structure, a pair of spaced, parallel, endless chains, means mounting the chains for movement relative to the supporting structure, a stairway step secured to the chains for movement therewith for appreciable distances past stationary parts closely adjacent said step, a pair of spaced sprocket wheels disposed for rotation relative to the supporting structure about a sprocket wheel axis for engaging respectively said chains to reverse the direction of travel thereof, a carriage for supporting said sprocket wheels for movement relative to the supporting structure, said carriage comprising a U-shaped yoke, said yoke having two spaced substantially parallel legs and a base portion interconnecting said legs, means mounting a separate one of said sprocket wheels in each of said legs for rotation relative to said yoke about said sprocket wheel axis, a separate leg supporting roller rotatably secured to each of said legs, a guide tongue secured to said base portion, a guide tongue supporting roller rotatably secured to said guide tongue, guiding means for the leg rollers, a plurality of guiding rollers for the tongue, said guiding means and guiding rollers permitting movement of the carriage and the sprocket wheels relative to the supporting structure in a first direction substantially transverse to said sprocket wheel axis and in a second direction opposite to said first direction and preventing pivotal movement of the carriage and the sprocket wheels about an axis substantially transverse to said sprocket wheel axis and to said first and second directions, and means coacting with the carriage to maintain the chains taut.

4. In a moving sairway, a supporting structure, a pair of spaced, parallel, endless, flexible units each defining a loop, a guide wheel located within the loop of each of the flexible units, means mounting said wheels for rotation relative to the supporting structure about a common axis for guiding the flexible units about the axis of the wheels, a stairway step secured to the flexible units for movement therewith, said mounting means comprising a yoke mounting the wheels for rotation relative to the yoke about said common axis, means mounting the yoke and wheels for movement relative to the supporting structure in a direction substantially transverse to the axis of the wheels, and means for preventing pivotal movement of the yoke and the wheels relative to the supporting structure about an axis substantially transverse to the common axis of the wheels and to said direction, said last-named means comprising anti-friction roller means guiding said yoke for movement in said direction relative to the supporting structure, said anti-friction roller means comprising a roller mounted for rotation about an axis transverse to said common axis and to said direction.

References Cited in the file of this patent

UNITED STATES PATENTS

| | | |
|---|---|---|
| 469,283 | Carver | Feb. 23, 1892 |
| 2,686,585 | Margles et al. | Aug. 17, 1954 |